United States Patent [19]

Adams

[11] 3,999,626

[45] Dec. 28, 1976

[54] APPARATUS AND SEISMIC METHOD

[76] Inventor: William M. Adams, 432 Pine St., Boulder, Colo. 80302

[22] Filed: Apr. 25, 1975

[21] Appl. No.: 571,785

Related U.S. Application Data

[63] Continuation of Ser. No. 134,619, April 16, 1971, abandoned.

[52] U.S. Cl. ............................. 181/114; 181/121; 181/125; 181/401; 73/71.5 R; 340/398; 116/144
[51] Int. Cl.$^2$ ...................... G01V 1/04; G01V 1/14
[58] Field of Search .......... 181/121, 113, 114, 125, 181/401; 340/398; 73/71.5 R, 71.6, 71.7; 280/214, 217; 116/62, 144; 74/11, 121, 494.2; 272/73

[56] References Cited

UNITED STATES PATENTS

| | | | |
|---|---|---|---|
| 620,893 | 3/1899 | Dickinson | 74/12 |
| 620,958 | 3/1899 | Pierman | 116/144 |
| 1,041,474 | 10/1912 | Holbrook | 116/144 |
| 1,329,940 | 2/1920 | Wallace | 280/217 |
| 1,790,080 | 1/1931 | Stanton | 181/121 |
| 2,385,892 | 10/1945 | Swanson | 74/594.2 |
| 2,982,371 | 5/1961 | Woods et al. | 181/121 |
| 3,185,250 | 5/1965 | Glazier | 181/121 |
| 3,191,713 | 6/1965 | Green | 181/125 |
| 3,244,252 | 4/1966 | Burns | 181/121 |

FOREIGN PATENTS OR APPLICATIONS 330,410 10/1935 Italy .................................... 280/217

OTHER PUBLICATIONS

"Seismic Soundings; A New Way to Make," 7/16/59, pp. 76–77, Engineering News-Record.

*Primary Examiner*—Nelson Moskowitz
*Attorney, Agent, or Firm*—Frederick L. Bergert

[57] ABSTRACT

A seismic generator for communicating from either above or below the surface of the earth is disclosed. The generator includes a system of eccentrically weighted masses such as, for example, unbalanced flywheels, which can be rotated to produce a seismic signal capable of being detected at great distances either on the surface or underground.

6 Claims, 4 Drawing Figures

INVENTOR
WILLIAM M. ADAMS

INVENTOR
WILLIAM M. ADAMS

APPARATUS AND SEISMIC METHOD

This is a continuation of application Ser. No. 134,619 filed Apr. 16, 1971, now abandoned.

BACKGROUND AND SUMMARY OF THE INVENTION

The present invention relates to a seismic generator. More particularly, the present invention relates to a seismic generator capable of generating seismic signals which can be detected at great distances either on the surface or underground.

Previous apparatus for communicating with persons underground has involved primarily electromagnetic energy-producing equipment. Such apparatus as has been used with a seismic energy-producing source has usually been restricted to an impulse source, such as the blow of a hammer. These prior art impulse sources characteristically produce a broad-band spectrum of energy with frequencies predominantly above about 100 cycles per second. Such higher frequency signals have a greater attenuation in rock than signals having frequencies below about 100 cycles per second. And additional drawback of the use of a hammer blow as the energy source is the danger of creating an underground explosion in areas where explosives may be present.

The present invention is directed to a seismic energy generator which can be operated either above or below ground and which requires only a small but steady input of energy to produce a signal of a frequency below about 100 cycles per second which can be easily detected and the position of the signal source determined at great distances either from the surface or underground. The present invention is adapted to permit a person trapped underground, for example, to transmit a seismic signal to facilitate the rapid location and recovery of the person trapped even in the absence of any means of power other than the manual power of the person himself. Location of the signal source can be by conventional methods including geometrical methods analogous to Loran or other routine navigational techniques. Reception of such a seismic signal provides an immediate indication that someone is alive underground, that rescue is desired and that someone is at the transmitter. Such an indication can be invaluable, for example, in the case of an underground disaster. Sharp impact between metal surfaces is not required in the apparatus of the present invention, with the result that the danger of creating an underground explosion as a result of operating the present apparatus is minimized.

The apparatus of the present invention includes a seismic generator which produces harmonic oscillations generated by rotating one or more eccentrically weighted masses. In one embodiment of the invention, weights may be attached to a plurality of flywheels and so positioned that, as the flywheels rotate, the weights are in phase when the weights are located in one predetermined plane but are out of phase when the weights are located in another plane which is perpendicular to the first predetermined plane. When more than one flywheel is employed, at least one flywheel should rotate in a direction opposite to that of the others. Rotation of the flywheels can be effected by the turning of a drive chain on a cycle apparatus which is powered either manually or by electric motor or other drive means.

Referring to the drawings.

DESCRIPTION OF THE PREFERRED EMBODIMENTS

Figure 2:
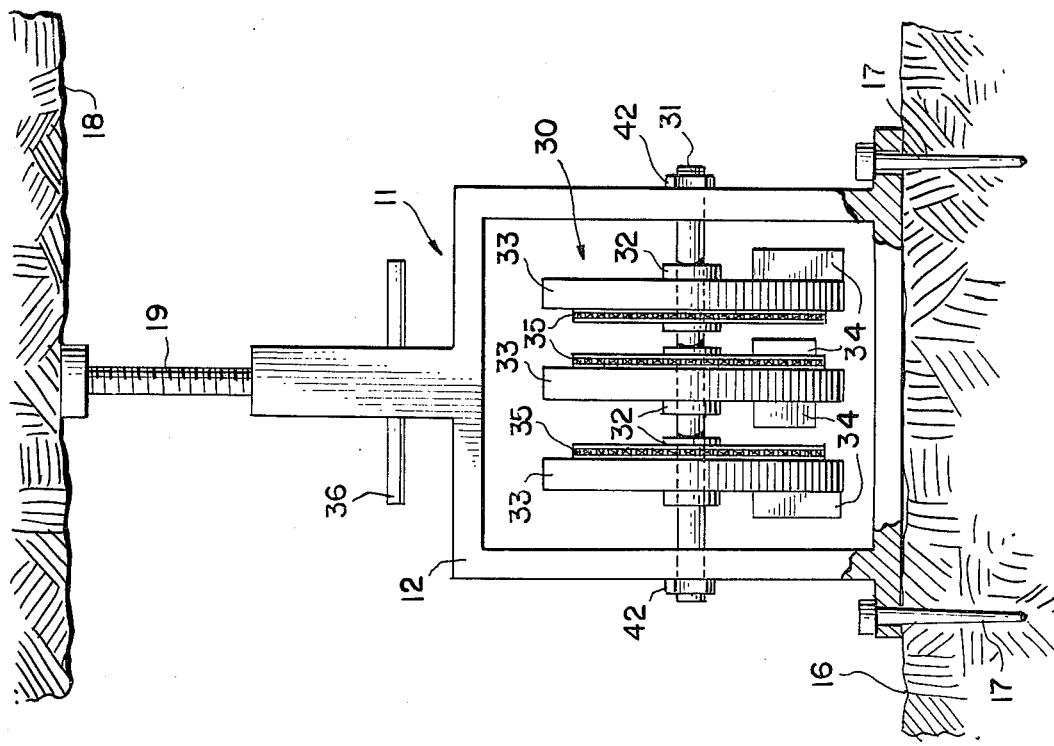
FIG. 2 is a front cross-sectional view through the forward vertical member of the apparatus shown in FIG. 1.

In the illustrated embodiment of the present invention as shown in FIGS. 1 through 4, apparatus 10 is provided for transmitting a seismic signal from below the surface of the earth. The apparatus includes a frame 11, formed of any suitable metallic or similar material, and having a pair of generally vertically extending support members 12 and 13 and a crossbar 14 which connects the vertically extending support members 12 and 13. Attached to the rear vertical member 13 is a seat 15, having a covering of fabric or other suitable material. Both the forward 12 and rear 13 vertical members are firmly secured to the lower surface 16 of the tunnel or other open within the earth by rock bolts 17 or other suitable means.

Figure 1:
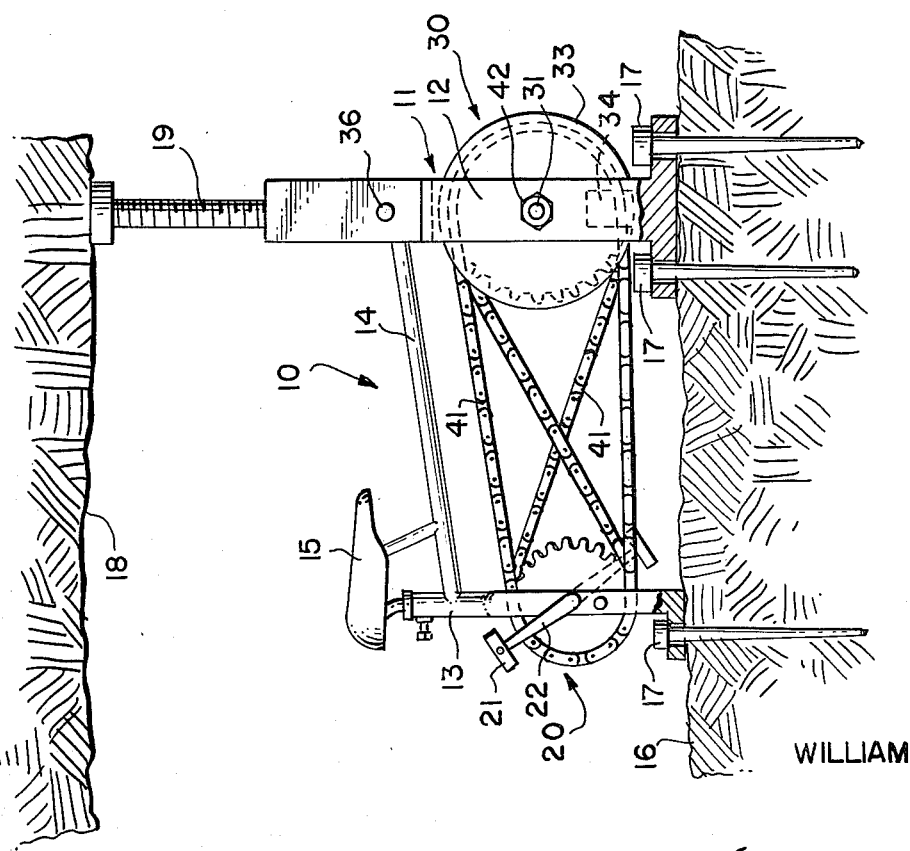
FIG. 1 is a side elevational view of apparatus constructed according to the principles of the present invention showing the apparatus in operative position with the frame in solid contact with the upper and lower surfaces of an underground opening in the earth.
Figure 3:
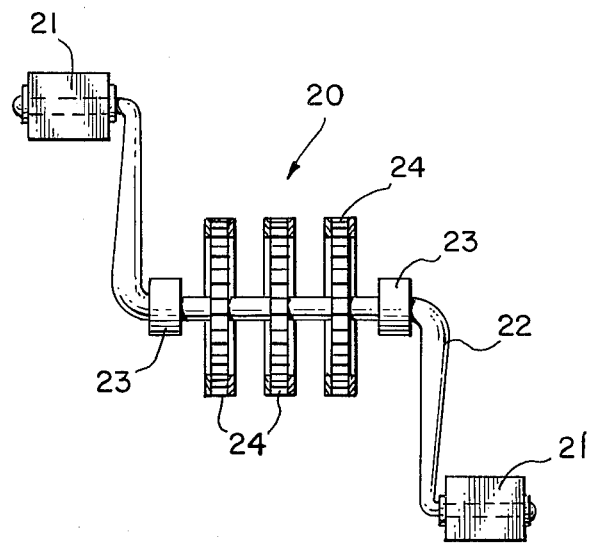
FIG. 3 is a front cross-sectional view of a pedal system which can be employed with the apparatus of the present invention.

Attached to the lower portion of the rear vertical member 13 is a pedal system 20, shown in detail in FIG. 3. This system 20 includes a pair of pedals 21, a pedal crank arm 22, and one or more bearings 23 for use in attaching the pedal system 20 to the rear vertical member 13 while allowing the pedal crank arm 22 to rotate freely. The pedal system 20 also includes a plurality of sprockets 24 to which are attached the drive chains 41, as shown in FIG. 1.

Figure 4:
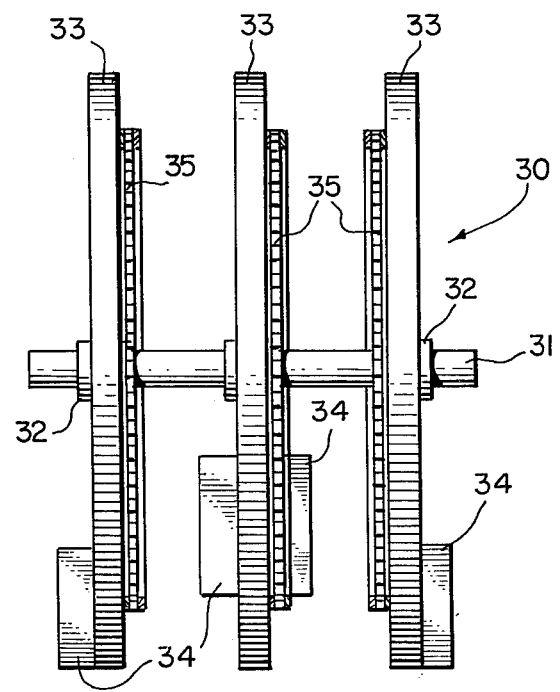
FIG. 4 is a cross-sectional view of a flywheel system which can be employed with the apparatus of the present invention.

Attached to the forward vertical member 12 is a flywheel system 30, shown in detail in FIGS. 2 and 4. The flywheel system 30 includes an axle 31 and a plurality of flywheels 33 which rotate about the axle 31 on bearings 32. The axle 31 is attached to the forward vertical member 12 by suitable securing means such as a nut 42. As shown in FIG. 2, the forward vertical member 12 can be secured to the upper surface 18 of the tunnel by suitably means such as a ceiling jack 19. Although the apparatus 10 is shown in the drawings as being connected both to the upper and lower surfaces of the tunnel, only one point of connection is required. When the apparatus 10 is located above the ground, for example, two points of connection may be employed with the lower end portions of the forward 12 and rear 13 vertical members in firm contact with the ground. Also the surfaces to which the apparatus 10 is connected need not be parallel to the surface of the earth since, for example, the points of contact could be the side walls of a tunnel rather than the upper and lower surfaces of the tunnel. Such a connection would be particularly advantageous when it is desired to communicate from tunnel to tunnel on the same level, for example. Attached to the outer portions of the flywheels 33 are a plurality of weights 34, as shown in FIGS. 2 and 4. Handle bars 36 are attached to the upper portion of the forward vertical member 12. A sprocket 35 is secured to each flywheel 33 for use in connecting drive chains 41 to the flywheel system 30. The flywheel system 30 and pedal system 20 are connected by a series of endless drive chains 41 with one drive chain connecting a sprocket 24 of the pedal system 20 with the sprocket 35 of the corresponding flywheel 33. As an alternative, a drive belt may be employed rather than a chain.

The axle 31 and crank arm 22 can be formed of metal bar stock or other suitable material. The flywheels 33 and sprockets 24 and 35 can be manufactured of a material such as aluminum or similar metal. The weights are normally formed of a heavy material such as cast iron or other similar material.

In operation, the apparatus of the present invention can be manually operated by a person sitting astride the seat 15 with his feet in engagement with the pedals 21 on either side of the rear vertical member 13. Grasping the handle bars 36 for support, the operator beings pedalling in a manner similar to that involved in the operation of a bicycle, with the pedals 21 rotating about the point of attachment of the crank arm 22 to the rear vertical member 13. As the pedals turn, motion is transmitted through the drive chains 41 to the flywheel system 30. At least one of the drive chains 41 is crossed between the pedal system 20 and the flywheel system 30 as shown in FIG. 1 so that the flywheel 33 associated with this crossed drive chain 41 will rotate in a direction opposite to that of the other flywheels. It may be desirable to provide a shield or roller guides of nylon or other suitable material, at the intersection where the chain crosses. In an alternative embodiment, one continuous chain may be employed rather than a separate chain for each flywheel.

As previously stated, only one flywheel or other eccentrically weighted mass need be employed with the apparatus of the present invention. The use of more than one flywheel does have advantages, however, since the use of two flywheels, for example, eliminates significant strain at various points within the equipment and the use of three or more flywheels eliminates perpendicular stress and also minimizes the rotational torque created by the rotating flywheels.

The object of attaching one or more weights to the flywheels as shown in FIGS. 2 and 4 is to cause each flywheel to be unbalanced. This unbalanced condition can also be otained by removing weight from the flywheel such as by making a hole in the flywheel. In addition, it is not necessary that the rotating unbalanced flywheel be in the form of a circular wheel; in an alternative embodiment, for example, a square-shaped rotor having one corner removed and attached at another corner position may be employed as the unbalanced flywheel.

The bearings 32 attached to the axle 31 of the flywheel system 30 provide a surface for the rotation of the flywheels 33 about the axle 31. The axle 31 thus need not, although it may, rotate. While the flywheel system 30 of the present invention is shown in FIGS. 1 through 4 with all flywheels rotating about a common axle, it is also within the scope of the present invention for each unbalanced flywheel to be rotatably mounted on a separate axle. The weights 34 which are attached to the flywheels 33 are positioned so that the moment produced by the weights rotating in one direction equals the moment produced by the weights rotating in the opposite direction. Thus, for example, if all the weights are attached to their respective flywheels at the same distance from the axle 31, the sum of the weights attached to the flywheels 33 rotating in one direction should be equal to the sum of the weights attached to the flywheels 33 rotating in the opposite direction.

The apparatus of the present invention functions as a seismic generator when the flywheels 33 are arranged so that the weights 34 attached to the flywheels 33 are in phase as the rotating weights pass simultaneously through a first predetermined plane which includes the axle 31 and the weights are mutually out of phase, i.e., the weights rotating in one direction are out of phase with the weights rotating in the other direction, by 180° when the weights pass through a second plane which includes the axle 31 and is perpendicular to the first mentioned plane. Thus, for example, the weights 34 may be positioned so that the weights are in phase when they pass through the vertical plane containing the axle 31 and out of phase when they pass through the horizontal plane containing the axle 31. By the term "in phase" is meant the position of the weights when all the weights 34 are in one plane containing the axle 31 and all the weights are one the same side of the axle 31. Conversely, when the weights are out of phase, all the weights are in one plane containing the axle 31 but the weights rotating in one direction are on the opposite side of the axle 31 from the weights rotating in the opposite direction.

In order to provide an arrangement of weights 34 on the rotating flywheels 33 which will allow the apparatus to function as a seismic generator, the weights may, for example, be initially positioned in a first plane containing the axle 31 and with the weights on the same side of the axle 31 prior to beginning the rotation of the flywheels. If all flywheel sprockets 35 have the same diameter and all pedal sprockets 24 have the same diameter, then upon initiating the rotation of the flywheels 33 by the action of the pedal system 20, the weights 34 rotating in one direction will rotate through an arc of 90 degrees during the same time period that the weights 34 rotating in the opposite direction are rotating through an arc of 90° so that the weights rotating in one direction will pass through a second plane which contains the axle 31 and which is perpendicular to the first plane at the same time that the weights rotating in the opposite direction pass through the second plane. Continuing to rotate, all the weights 34 will then rotate through an additional 90° arc during the same time period at the end of which all the weights 34 will once again be in phase. The foregoing pattern will be repeated during consecutive rotations of the flywheels 33.

It may be desirable to connect the present seismic generator to the adjacent surface through a spring or other biasing means. By the use of a spring, for example, at one or more of the attachment locations, means is provided for a resonant coupling of the apparatus to the earth or other adjacent surface. Such a connection can provide frequency selectivity as well as signal amplification.

The present apparatus can be employed to transmit a seismic signal from above ground or from an underground position to a position either above or below ground level. Means other than the manual power of the operator, such as, for example, an electric motor, can be employed to drive the flywheels. Additional features such as, for example, a clutch, may be incorporated in the present invention. Also, a governor may be employed with the seismic generator, and such a feature would be particularly helpful in allowing a receiver to distinguish between various seismic generating equipments due to the variation in frequency which would be obtained depending on the speed at which the equipment was allowed to operate.

As an alternative means of providing identification to a receiving station of a particular seismic generator installation, a pair of seismic generators of the present invention may be employed in a single installation with, for example, a single pedal system being coupled to two separate unbalanced flywheel systems. The ratio of the diameters of the pedal sprockets and the flywheels of one system should be different from the ratio of the corresponding diameters of the other system so that the signals produced by the two generators will have different frequencies. The ratio of the two frequencies produced can be easily determined by the receiving station, employing standard signal extraction techniques such as, for example, harmonic analysis. By constructing each seismic generator installation in a given area so that no two installations have the same frequency ratio, means of accurate identification is provided.

The present seismic generating apparatus can be employed as part of a transceiving system in conjunction with a seismic detector coupled to an amplifier. The present apparatus is also capable of transmitting through media other than rocks, such as through the water from a submarine, for example, or through the ice in a polar region. The seismic generator of the present invention produces a seismic signal which may be easily extracted from the microseismic background at distances up to several thousand feet. The nature of the seismic signal is such that transmission improves with increased water content in the sediment through which the signal travels. This is a definite advantage over electromagnetic transmissions, where the transmitted signal is degraded as it travels through sediment having high water content.

The seismic generator of the present invention can also be advantageously employed in the shaking of buildings and other structures to determine the characteristic modes of the structures. This information can be of great value in the determination of the resistance of a structure to earthquake damage, for example. When employed as a building shaker, the present seismic generator may be installed in a hallway or room on one floor of the building and operated to produce a seismic signal. The present invention is particularly desirable for such applications since it may be operated manually, thus eliminating the need for a power source within the building other than the person operating the equipment. After the characteristic modes of the building have been determined in this location, the generator may be transported to other floors in order to obtain measurements at various locations throughout the building.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely preferred embodiments thereof.

It is claimed:

1. A method for allowing a person located within an underground opening below the surface of the earth to communicate from said underground opening which comprises:
    a. mounting a support member in vibratory contact with the surface adjacent an underground opening within the earth, said support member having attached thereto an axle member with at least open eccentrically weighted mass rotatably mounted on said axle member;
    b. connecting said eccentrically weighted mass to a drive chain mounted on a pedal system; and
    c. rotating the eccentrically weighted mass about the axle by means of the pedal system which is driven by human motive power to produce a seismic signal.

2. The method of claim 1 which further comprises receiving said seismic signal at a point on the surface of the earth.

3. The method of claim 1 wherein the seismic signal produced has a frequency of less than about 100 cycles per second.

4. The method of claim 1 wherein the eccentrically weighted mass is an unbalanced flywheel and wherein a plurality of unbalanced flywheels are employed, the flywheels being unbalanced by the addition of a weight to the outer portion of each flywheel, and wherein the flywheels are mounted so that at least one flywheel rotates in a direction opposite to the direction of rotation of at least one other flywheel.

5. The method of claim 4 which further comprises adjusting the location and amount of weight on the flywheels such that the sum of the moments produced by the weights attached to the flywheels rotating in one direction is equal to the sum of the moments produced by the weights attached to the flywheels rotating in the opposite direction.

6. The method of claim 5 which further comprises positioning the weights on the flywheels so that said weights pass simultaneously through a predetermined plane containing the axle with all the weights being located on the same side of the axle, and so that the weights simultaneously pass through a second plane containing the axle which is perpendicular to the aforementioned predetermined plane with the weights rotating in one direction being located on the opposite side of the axle from the weights rotating in the opposite direction.

* * * * *

UNITED STATES PATENT AND TRADEMARK OFFICE
CERTIFICATE OF CORRECTION

PATENT NO. : 3,999,626
DATED : December 28, 1976
INVENTOR(S) : William M. Adams

It is certified that error appears in the above-identified patent and that said Letters Patent are hereby corrected as shown below:

Column 6, line 17, cancel "open" and insert --one--.

Signed and Sealed this

Twenty-ninth Day of March 1977

[SEAL]

Attest:

RUTH C. MASON
*Attesting Officer*

C. MARSHALL DANN
*Commissioner of Patents and Trademarks*